Nov. 27, 1951  C. DE MARVAL  2,576,450
AUXILIARY CARBURATION DEVICE
Filed Nov. 21, 1949
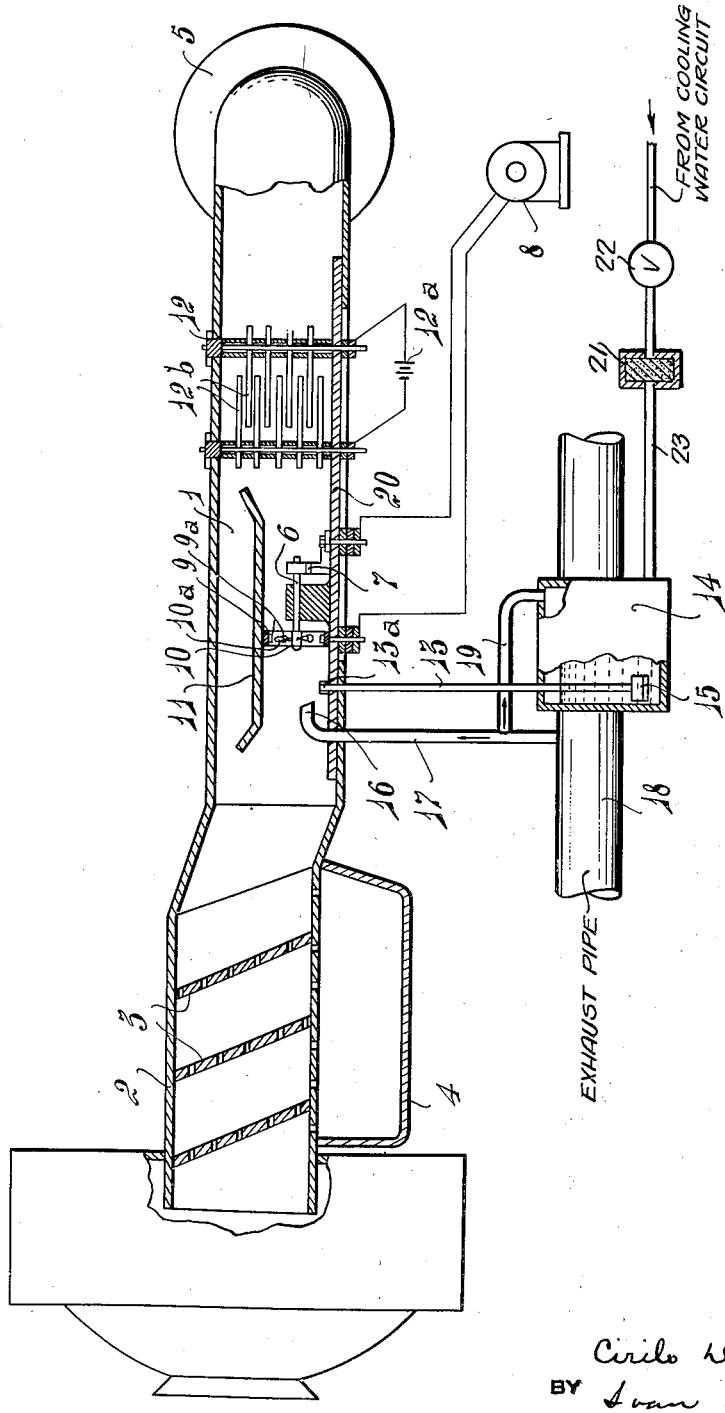
INVENTOR
Cirilo De Marval
BY Ivan P. Tashof,
ATTORNEY Patented Nov. 27, 1951

2,576,450

UNITED STATES PATENT OFFICE 2,576,450

AUXILIARY CARBURETION DEVICE

Cirilo de Marval, Buenos Aires, Argentina

Application November 21, 1949, Serial No. 128,537
In Argentina October 13, 1949

5 Claims. (Cl. 123—25)

The present invention relates to carburation devices and has for its purpose to provide an auxiliary device readily applicable to internal combustion engines and adapted to improve the operation of the motor and achieve a considerable saving in the consumption of hydrocarbons.

According to the present invention, I provide a device which adds to the combustion mixture a quantity of vapors derived from water and obtained by means of a heat and electrical treatment performed by my auxiliary carburation device. Said vapors have been shown by experiment to increase the power output and the flexibility of the engine and at the same time reduce the consumption of hydrocarbon fuel by almost one half.

One feature of the device, which is of considerable practical interest is that it does not call for any substantial structural modifications of the engine as such nor for the addition of extra controls, neither does my novel carburation device alter the compression ratio. Again, in the more usual case of engines for land or water vehicles, the auxiliary carburation device of the present invention does not call for the provision of a separate watertank or filler opening for the water required since the water may be taken from the cooling-water circuit.

Hence it is a principal object of the present invention to provide an auxiliary carburation device for internal combustion engines, which shall operate with water and increase the power output of the engine while at the same time reducing the hydrocarbon fuel consumption.

It is a further object of the present invention to provide an auxiliary carburation device of the kind described, which shall be readily applicable to existing types of internal combustion engines without calling for structural alterations therein.

Another object of the present invention is to provide an auxiliary carburation device of the kind described arranged to be connected to the cooling-water circulation system of an internal combustion engine.

A still further object of the present invention is to provide an auxiliary carburation device of the kind described including heating means and electrical means for deriving from water a quantity of vapors to be combined with the combustion mixture.

The auxiliary carburation device of the present invention consists essentially of a treatment chamber communicating at one end with the atmosphere through a filter and at the other end with the engine intake pipe at a point thereon on the engine side of the throttle, said chamber containing a high tension spark device adapted to decompose steam, means on the side of said spark device remote from the engine, for producing a jet of steam directed to the spark device, on the other side of which I provide a low tension ionizing condenser through which a stream of vapors derived from the steam must pass before entering the intake.

Conveniently the means for producing the jet of steam includes a water supply pipe through which a thin column of water is forced up into the treatment chamber, and a heating and blast device having an outlet positioned substantially on a level with the outlet end of the supply pipe, said heating and blast device being connected to the exhaust pipe whereby a by-passed portion of the exhaust gases is used as the active agent for converting the water into steam and for blowing a jet of steam towards the spark device.

These and other features, objects and advantages of the present invention will become further apparent in the course of the following detailed description of a preferred embodiment thereof illustrated in the accompanying drawings, in which:

Fig. 1 is a partly diagrammatic view of a preferred embodiment of my auxiliary carburation device shown partly in longitudinal section.

As shown in the drawing, the device of the present invention comprises a treatment chamber 1 which at one end has coupled to it an air filter 2 comprising a series of suitably perforated baffles 3 and a dust trap 4.

The other end of chamber 1 is adapted to be coupled to the engine intake pipe (not shown) as by a coupling 5.

Inside chamber 1 are mounted the treatment means which comprise electrical means capable of decomposing steam into its chemical components.

As shown said electrical means are constituted by a spark device which comprises a rotary shaft 6, electrically connected, as by means of a ring and brush arrangement diagrammatically indicated at 7, to one pole of a high tension generator 8, the other pole of which is connected electrically to a stator 9 having a plurality of studs 9a, say six, of conducting material mounted inside the stator 9 around a rotor 10 mounted on the shaft 6. Said rotor has a number of radial vanes 10a, for example three vanes, generally coplanar with the studs and of length sufficient just to clear said studs. Constructed as described, the spark device when rotated will give eighteen sparks per revolution. Rotation of the rotor is caused by the passage along the treatment chamber 1, of a stream of steam produced and blown towards the motor intake in a manner to be described hereinbelow.

I prefer, both in order to provide additional support for the stator 9 as well as to guide the stream of steam, to fit a cross-plate 11 in chamber 1, said plate extending in one direction towards the end of the chamber to be coupled to the intake up to a point in the vicinity of a static condenser 12 which is adapted to be connected to a source 12a of low tension current, and has plates 12b disposed parallel to the center line of chamber 1 extending between the ends thereof.

Cross-plate 11 extends in the opposite direction towards the atmospheric air inlet end of the device a sufficient distance to cover the steam generating means or heater blower means, which is located in the chamber 1 between the spark device and said inlet end.

The heater blower means comprises essentially a water tube 13 the upper or discharge end 13a of which is located in chamber 1 opposite lateral mouth 16 of a heating and blowing pipe 17. At its other end, the water tube 13 extends deeply into a closed storage tank 14 for water, and is provided with a suitable filter 15. The heating and blowing pipe 17 constitutes a by-pass from the engine exhaust pipe 18 and has a branch 19 which opens in the tank 14 above the maximum level of water therein.

Hence when the engine is running some of the hot exhaust gases passing along the exhaust pipe 18 will be by-passed to the blowing pipe 17 and therein will divide into a portion which will enter tank 14 to exert pressure on the water therein contained to force the same up the water tube 13, and another portion which will continue along the blower pipe 17 until it issues from lateral mouth 16 as a blast directed towards the outlet end of the chamber 1 and across the discharge in 13a of water tube 13 to evaporate very rapidly the water as it emerges therefrom and to blow a mixture of steam and exhaust gases towards the spark device 9, 10.

The storage tank 14 may, as shown, be so to speak self-contained that is to say it may be designed to be filled independently of any other sources of water associated with the engine or it may be connected to a point in the cooling-water circuit, for instance to a point near the top of the radiator if any. Conveniently a double filter 21 and a loaded valve 22 should be included in the supply line 23 between the tank 14 and its connection to the cooling-water circuit to avoid a flow of water to the tank 14 at slow or idling engine speeds. Where this last arrangement is adopted the storage tank 14 will draw water from the circulation system as required, so that a separate water filling operation for the storage tank is avoided. Trials have shown that the water consumption of my auxiliary carburation device is so small that its connection to the cooling-water circuit will not interfere with the proper cooling of the engine and moreover a storage tank with a capacity sufficient to give about a 1000 or 1200 mile driving range may readily be provided.

Reverting now to a consideration of the operation of the auxiliary carburation device, since the water is forced up in accordance with the pressure of one by-passed portion of the exhaust gases and is also evaporated and blown towards the spark device by another by-passed portion of the exhaust gases, it will be clear that the auxiliary device will operate in a manner directly depending on the running of the engine and hence in accordance with the fuel demand. Hence the addition of the mixed vapors provided by my novel device will regulate itself automatically in accordance with engine requirements.

When the steam generated at the discharge end of the water tube reaches the rotor 10 under the pressure of the blast from the exhaust gases emerging from the lateral opening 16, the fluid mixture will cause the rotor to rotate by impinging on the vanes thereof and thereby cause sparking to take place at the studs 9a.

Under these conditions the steam present in the mixture is decomposed into oxygen and hydrogen and the oxygen molecules link up to form ozone.

Hence in its further travel the fluid mixture will comprise hydrogen and ozone and will, by the engine suction, be drawn towards the intake, whereby being caused to pass through the static low tension field provided by the condenser 12 where said mixture is ionized, and in this condition it enters the engine intake and there mingles with the normal combustion mixture derived from a conventional carburator (not shown). It should also be noted that the fluid mixture in passing through the spark device 9, 10 is subjected to quite intense agitation so that a very high degree of homogeneity is ensured. On the other hand, the parallel plates of the condenser 12 act to smooth out the stream of fluid mixture which thus enters the intake in a relatively tranquil state, free from turbulence and eddies.

This tranquil stream on entering the carburation zone in the intake, helps to smooth out the flow of the total carburation mixture thus assisting in improving the engine efficiency. Moreover, owing to the relatively high temperature of the additional fluid mixture, vaporization of the total carburation mixture is favored whereby the speed of combustion is increased.

It has also been found that my novel auxiliary carburation device unexpectedly acts as a supercharger.

Hence the jet orifice should be suitably adjusted or the opening of the throttle should be restricted or both solutions may be adopted.

Nevertheless the normal compression ratio of 5–6 may be increased up to 7–8 since the total mixture does not produce knock under a ratio of 8–9, and if alcohol, benzine or tetraethyl lead be added, the anti-knock properties may be conserved even up to a ratio of from 10–12.

The electrical parts of my auxiliary carburation device, that is to say the water decomposing means and the ionizing means should of course be insulated electrically from the main chamber structure. Conveniently said parts may be mounted on a base plate 20 of insulating material and said base plate may, as shown, be used to form part of the wall structure of chamber 1.

Although I have described my auxiliary carburation device with particular reference to a preferred embodiment, I do not intend to be limited thereby, but it is to be understood that I may make all such modifications therein as lie within the scope of the appended claims:

I claim:

1. An auxiliary carburation device intended to be connected to an intake pipe of an internal combustion engine operating on hydrocarbon fuel and including an exhaust pipe, said device comprising a treatment chamber having an air inlet end and a fluid mixture outlet end, means for coupling said fluid mixture outlet end to said intake pipe, a high tension spark device in said chamber at a position intermediate said ends, a low tension plate type condenser in said chamber located between the spark device and the outlet end, a water tube having a discharge end located in said chamber between the spark device and the air inlet end, a storage tank for water, the end of the water tube remote from the discharge end being located in said storage tank heater and blower means including a mouth located in said chamber between said air inlet end and said water tube and directed towards the fluid mixture outlet end, said heater and blower means including a conduit connected to the engine exhaust pipe and having a branch terminating at said storage tank above the maximum water level therein.

2. An auxiliary carburation device for internal combustion engines operating on hydrocarbon fuel and comprising an exhaust pipe and an intake including a throttle, said auxiliary carburation device comprising a treatment chamber having an air inlet end and a fluid mixture outlet end, connecting means for coupling said outlet end to said intake between said throttle and the engine, a high tension electrical steam decomposing device located in said chamber at a position intermediate said ends, a low tension electrical ionizing device in said chamber between the steam decomposing device and the fluid mixture outlet end, a steam generating and blowing device in said chamber between the steam decomposing device and the air inlet end, said steam generating and blowing device comprising water supply means connected to a source of water and heating and blowing means connected to said exhaust pipe and having a mouth located in said chamber and directed towards the outlet end thereof.

3. An auxiliary carburation device for internal combustion engines operating on hydrocarbon fuel and comprising an exhaust pipe and an intake including a throttle, said auxiliary carburation device comprising a treatment chamber having an air inlet and a fluid mixture outlet, connection means for connecting said outlet to the intake between the throttle and the engine, a high tension electrical rotary steam decomposing device in said chamber at a point intermediate said ends, a steam generating and blowing device in said chamber between said steam decomposing device and the air inlet end, said steam generating and blowing device including a water tube connected to a source of water comprising a storage tank, the steam generating and blowing device further including heating and blowing means comprising a conduit connected to said exhaust pipe and including a branch connected to said storage tank and a mouth in said chamber directed towards said water tube and said outlet end, a low tension ionizing condenser located in said chamber between said steam decomposing device and the outlet end, and electrical connection means for said steam decomposing means and said condenser.

4. An auxiliary carburation device for internal combustion engines operating on hydrocarbon fuel and comprising an exhaust pipe and an intake including an unobstructed portion adjacent the engine, said auxiliary carburation device comprising a treatment chamber having an air inlet and a fluid mixture outlet, connecting means for connecting said outlet to said unobstructed portion of the intake, a high tension electrical steam decomposing means located in said chamber between the ends thereof and comprising a stator having a plurality of conductive studs disposed in a circle, a rotor having a plurality of vanes and an axis passing through the centre of said circle, said vanes being so proportioned and arranged as to just clear said studs during rotation, and electrical connection means for said stator and said rotor, a low tension ionizing condenser comprising plates arranged substantially parallel to the center line of said chamber between the ends thereof, electrical connection means for said condenser, electrical insulating means for insulating said steam decomposing means and said ionizing condenser from said chamber, steam generating means located in said chamber between the steam decomposing means and the air inlet end and comprising a water tube having a discharge end located in the chamber, and heating and blowing means including a mouth in said chamber directed towards said discharge end and towards the outlet end of the chamber, said heating and blowing means also including a conduit connected to the exhaust pipe and having a branch, a storage tank for water having a top and a bottom, said branch being connected to the top of said tank and the end of the water tube remote from the discharge end extending into said tank in proximity to said bottom.

5. In and for an internal combustion engine operating on hydrocarbon fuel and including an exhaust pipe, a cooling-water circulating system and an intake comprising an unobstructed portion adjacent the engine, an auxiliary carburation device comprising a treatment chamber having an air inlet end and a fluid mixture outlet end, connection means connecting said outlet end to said unobstructed portion of the intake pipe, and high tension electrical steam decomposing device located in said chamber intermediate the ends thereof, a low tension electrical ionizing device in said chamber between the steam decomposing device and the outlet end, steam generating and blowing means in said chamber between said steam decomposing device and the inlet end, a water storage tank, a supply conduit connecting said tank to the cooling-water circulating system, said steam generating and blowing means comprising a water tube having one end located in said chamber and another end located in said tank, and heating and blowing means comprising a conduit having an end located in said chamber and including an opening directed towards said one end of the water tube, the end of said conduit remote from the opening being connected to said exhaust pipe, said conduit including a branch extending therefrom to said tank.

CIRILO DE MARVAL.

REFERENCES CITED

The following references are of record in the file of this patent:

UNITED STATES PATENTS

| Number | Name | Date |
|---|---|---|
| 892,378 | Martini | June 30, 1908 |
| 1,108,608 | Nedoma | Aug. 25, 1914 |
| 1,257,053 | Warman | Feb. 19, 1918 |
| 1,259,898 | Osowski | Mar. 19, 1918 |
| 1,262,034 | Frazer | Apr. 9, 1918 |
| 1,333,836 | Csanyi | Mar. 16, 1920 |
| 1,333,837 | Csanyi | Mar. 16, 1920 |
| 1,333,838 | Csanyi | Mar. 16, 1920 |